(12) United States Patent
Ramsey

(10) Patent No.: US 6,416,069 B1
(45) Date of Patent: Jul. 9, 2002

(54) UNDERBEAM AXLE LIFT ASSEMBLY

(75) Inventor: John E. Ramsey, Canton, OH (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/375,133

(22) Filed: Aug. 16, 1999

(51) Int. Cl.$^7$ .............................................. B60G 11/00
(52) U.S. Cl. ...................... 280/124.116; 280/124.128; 280/124.153; 280/763.1; 280/414.5; 188/361
(58) Field of Search .................. 280/124.116, 124.117, 280/124.128, 124.153, 124.157, 763.1, 6.153, 86.5, 43.17, 414.5, 43; 188/152, 361, 153 R, 153 D

(56) References Cited

U.S. PATENT DOCUMENTS

| | | | |
|---|---|---|---|
| 4,171,830 A | | 10/1979 | Metz .......................... 280/711 |
| 4,174,855 A | * | 11/1979 | Vandenberg ................ 280/711 |
| 4,202,454 A | * | 5/1980 | Browne et al. ............... 213/86 |
| 4,445,707 A | * | 5/1984 | Raidel ........................ 280/687 |
| 5,058,916 A | * | 10/1991 | Hicks .......................... 280/704 |
| 5,230,528 A | * | 7/1993 | Van Raden et al. ......... 280/704 |
| 5,403,031 A | * | 4/1995 | Gottschalk et al. ......... 280/704 |
| 5,505,481 A | * | 4/1996 | VanDenberg et al. ....... 280/704 |
| 5,505,482 A | * | 4/1996 | VanDenberg ................ 280/704 |
| 5,536,036 A | * | 7/1996 | Ehrlich ........................ 280/711 |
| 5,655,788 A | * | 8/1997 | Peaker ........................ 280/711 |
| 5,778,798 A | * | 7/1998 | VanDenberg ............ 105/215.2 |
| 5,791,681 A | * | 8/1998 | VanDenberg ................ 280/713 |
| 5,868,418 A | * | 2/1999 | VanDenberg ................ 280/704 |
| 6,003,885 A | * | 12/1999 | Richardson ................ 280/86.5 |
| 6,007,078 A | * | 12/1999 | Gottschalk et al. ..... 280/86.751 |
| 6,062,578 A | * | 5/2000 | Richardson ................ 280/81.6 |
| 6,073,946 A | * | 6/2000 | Richardson ................ 280/86.5 |
| 6,073,947 A | * | 6/2000 | Gottschalk et al. ... 280/124.128 |
| 6,322,089 B1 | * | 11/2001 | Dantele et al. ....... 280/124.128 |

FOREIGN PATENT DOCUMENTS

| | | | | |
|---|---|---|---|---|
| EP | 0 941 915 A1 | | 9/1999 | |
| GB | 2194761 A | * | 3/1988 | ............ B60G/3/14 |

* cited by examiner

*Primary Examiner*—Brian L. Johnson
*Assistant Examiner*—J. Allen Shriver
(74) *Attorney, Agent, or Firm*—Buckingham, Doolittle & Burroughs, LLP; David P. Dureska, Esq.

(57) ABSTRACT

A lift assembly for an axle of the trailer of a semi-trailer or of another vehicle such as a straight truck, is mounted generally adjacent to and beneath each suspension beam of the axle/suspension systems of the trailer or other vehicle. The manner of mounting the lift assembly generally adjacent to and beneath the beam provides sufficient clearance for concurrent disposition of a dual service/parking brake chamber adjacent to and beneath the beam. The location and orientation of the axle lift assembly, relative to radial lines emanating from the pivot point of the suspension beam, facilitates the application of efficient lift forces to the beam by the lift assembly, which in turn results in less wear to an air chamber of the lift assembly. The air chamber of the lift assembly can be quickly and easily removed and reinstalled to allow for replacement of the dual brake chamber.

19 Claims, 5 Drawing Sheets

UNDERBEAM AXLE LIFT ASSEMBLY

BACKGROUND OF THE INVENTION

1. Field of the Invention

The invention relates to lift assemblies for axles of the trailer of a semi-trailer, and in particular to lift assemblies located generally adjacent to and beneath beams of suspension assemblies of the trailer. More particularly, the invention is directed to an underbeam axle lift assembly which operates efficiently and provides clearance for location of a dual brake chamber generally adjacent to and beneath the beam, and which facilitates installation and removal of the dual brake chamber.

2. Background Art

It is a common practice to lift one or more of the trailer axles of a semi-trailer and to maintain the lifted axles in a raised position, which in turn causes the wheels and tires attached to the raised axles to be lifted off of the ground. Removing certain ones of the semi-trailer wheels and tires from ground contact typically is done when the trailer is free of payload and less than all of the wheels/tires of the trailer can adequately support the unloaded trailer. This results in improved turning radius and maneuverability of the trailer. Another common reason for lifting the axle simply is to reduce wear on the lifted axle, wheels and tires when the vehicle is traveling in an unloaded condition. It should also be noted that axle lifts have been utilized on vehicles other than semi-trailers.

Axle lift assemblies have been utilized for many years in the semi-trailer industry and can be found in various designs. However, the designs typically are of the overaxle-type, that is, the lift assembly is mounted above the suspension assembly beam and inboard from the suspension beam and above the axle. Unfortunately, while such designs achieve their intended function of lifting an axle, the overaxle designs are costly to manufacture because they typically require additional structures, such as brackets and the like, to be mounted on the frame of the trailer or vehicle in order to support the lift assembly. This increased complexity of such top-mounted lift assemblies also results in increased installation and maintenance costs. Moreover, such additional support structure adds unwanted weight to the vehicle. Also, the many different trailer and vehicle designs, as well as the various axle/suspension systems that support them, involve different degrees of clearance, so that typically one type of lift assembly is suitable only for certain applications.

Due to the above-noted limitations of top-mounted lift assemblies, axle lift assemblies mounted beneath suspension assembly beams have become popular, particularly in Europe. This popularity can be attributed to the fact that the lift assembly mounts directly to the suspension beam and its support structure, and is free of additional support brackets and the like. However, it should be noted that in Europe trailer axles must be grouped in a tri-axle arrangement or three axles together. According to European regulations, only two of the three grouped axles are required to have a parking brake or emergency brake chamber, in addition to a service brake chamber. Specifically, a service brake chamber applies braking force to a vehicle when pressurized air is supplied to the chamber during operation of the vehicle. A parking brake chamber applies braking force to the vehicle when the vehicle is shut down or parked, and a spring contained in the chamber applies that braking force when pressurized air is removed from the chamber due to the shut down or parking of the vehicle. Since such parking and service brake chambers also are mounted beneath the suspension beams, the lift devices, when used, typically are installed beneath an axle lacking a dual parking/service brake chamber, and having only a service chamber, due to space considerations.

Thus, since underbeam lift devices evolved in Europe for applications in which brake chambers were mounted on the axle inboard from the suspension beams, or for applications in which only a service brake chamber was mounted in the area beneath the beam, clearance is lacking for mounting of the same type of underbeam axle lift assembly in United States applications having a dual brake chamber mounted beneath the beam. Unfortunately, in the United States, most trailer axles are grouped in a tandem configuration or two axles together, and are required by United States regulations to each have service and parking brake chambers. The same regulations generally also apply to vehicles other than semi-trailers, such as dump trucks and cement mixer trucks, which are commonly and collectively referred to as straight trucks. Thus, any underbeam axle lift assembly must accommodate the reduced clearance caused by the United States dual brake chamber requirement. The European type underbeam axle lift assembly simply fails to fit within such space constraints. Thus, the need has existed for a lift assembly that can be mounted beneath a suspension assembly beam despite the presence of a dual brake chamber beneath that beam, and still efficiently raise the axle and be easily removed and replaced, enabling removal and replacement of the dual brake chamber.

The present invention solves the above-described problems by providing an efficient air spring-driven axle lift assembly that is removably mounted on the suspension assembly beam and its hanger bracket without encroaching into the space of the dual brake chamber, and which can be easily removed and reinstalled for facilitating installation or removal of the dual brake chamber.

SUMMARY OF INVENTION

Objectives of the present invention include providing an axle lift assembly which can be mounted beneath the beam of a suspension assembly without interfering with an underbeam mounted dual parking/service brake chamber.

A further objective of the present invention is to provide such an underbeam axle lift assembly which operates more efficiently and is subject to less wear than prior art underbeam axle lift assemblies.

Another objective of the present invention is to provide such an improved underbeam axle lift assembly which can be quickly and easily removed and reinstalled to enable removal and installation of a dual brake chamber.

These objectives and advantages are obtained by an assembly for lifting a beam and an axle of an axle/suspension assembly, the assembly including means mounted generally adjacent to the beam and generally below an upper surface of the beam, for generating a force for lifting the axle and the beam, the lift assembly enabling disposition of a dual service/parking brake chamber generally adjacent to the beam and generally below the upper surface of the beam.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
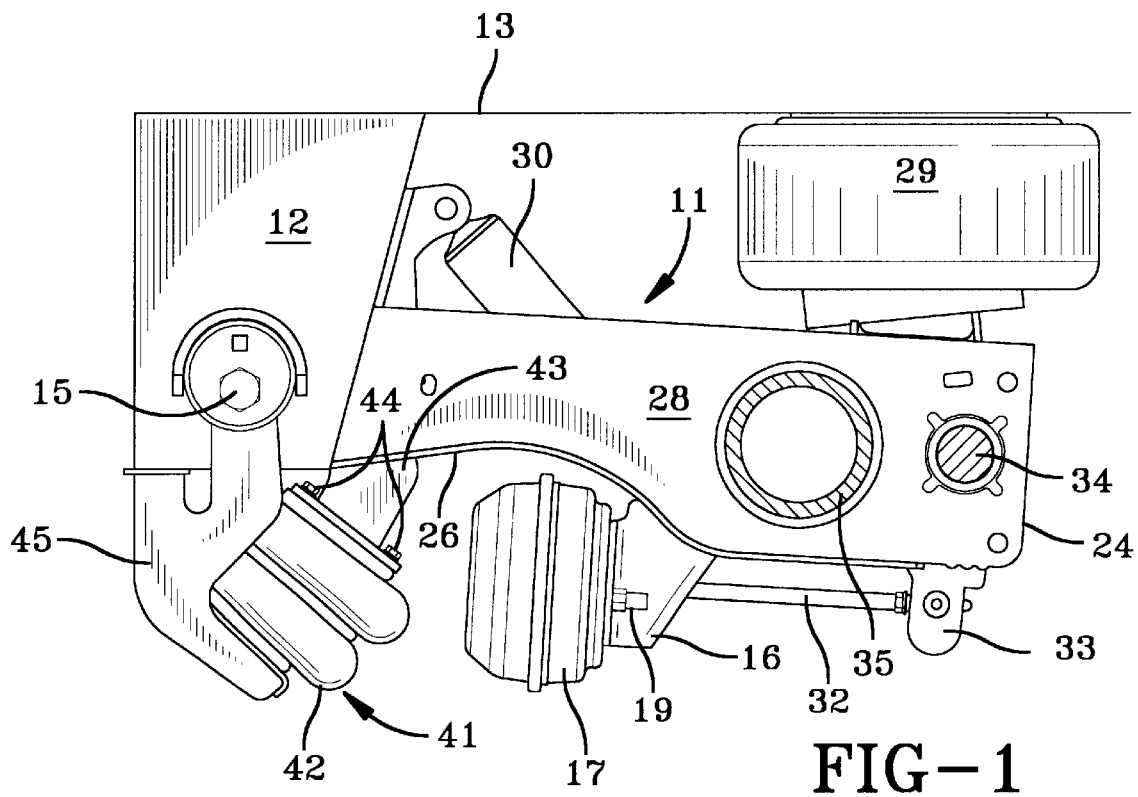
FIG. 1 is a side elevational view, with portions in section, of an underbeam axle lift assembly of the type utilized in European applications, showing the lift assembly mounted on the hanger and beam of the suspension assembly having only a service brake chamber.
Figure 2:
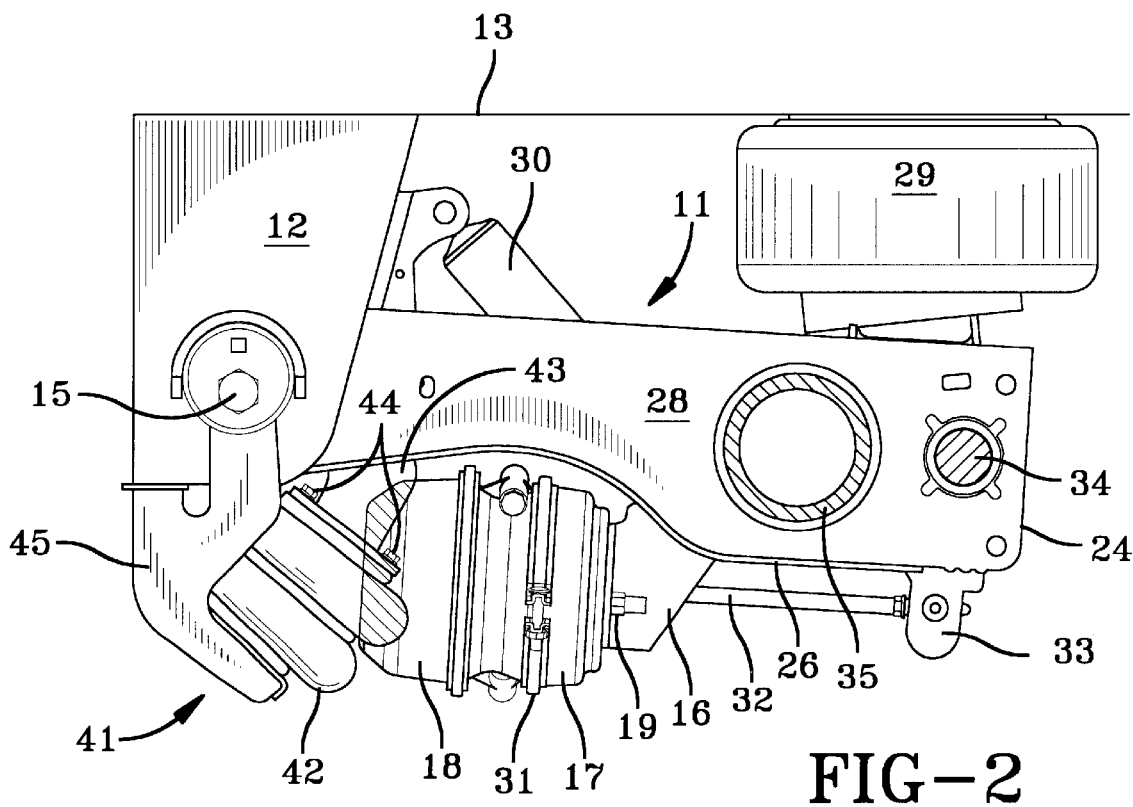
FIG. 2 is a view similar to FIG. 1, but illustrating with hatching the lack of clearance preventing installation of the European-type underbeam lift assembly in conjunction with an underbeam dual service/parking brake chamber.
Figure 3:
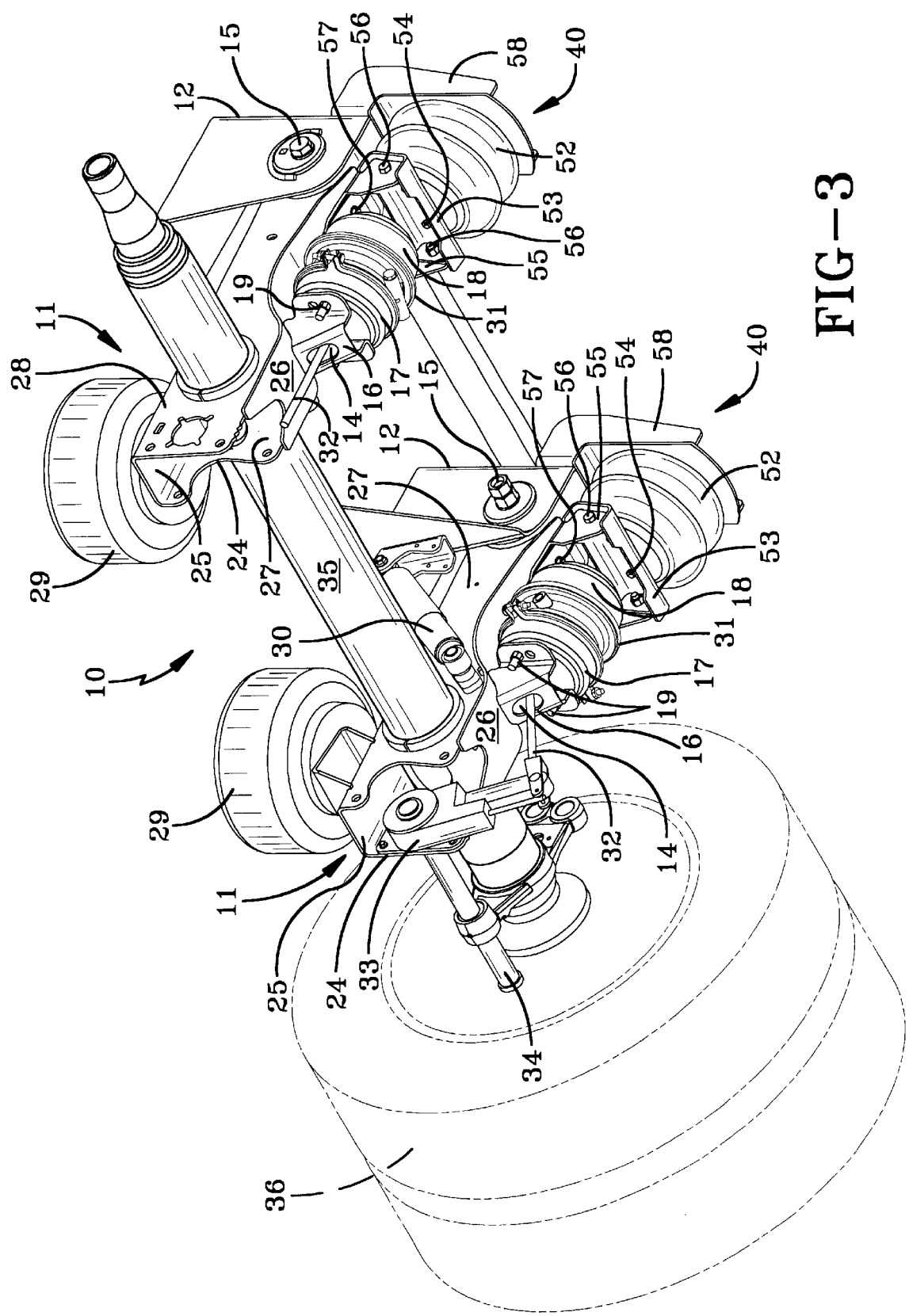
FIG. 3 is a perspective view of an axle/suspension system, showing one set of wheels and tires in phantom lines mounted on one end of the axle, and further showing the axle lift assembly of the present invention mounted beneath each of the suspension assemblies.

So that one representative environment in which the underbeam axle lift assembly of the present invention operates, as well as the present invention itself, both can be better understood, an air-ride beam-type trailing arm axle/suspension system for a tractor-trailer is indicated generally at 10 and is shown in FIG. 3. Inasmuch as axle/suspension system 10 includes generally identical suspension assemblies 11 each suspended from a respective one of a pair of hangers 12, only one of the suspension assemblies will be described herein, and is shown both in prior art FIGS. 1–2 and 9, and FIGS. 4–8 showing the present invention. Hanger 12 is, by any suitable means, securely mounted on and depends from the underside 13 of the trailer of a semi-trailer or other vehicle.

A bushing 23, (FIGS. 4, 6 and 7) is pivotally mounted on hanger 12 by any suitable means such as a bolt 15. Bushing 23 preferably is of the type having multifunctional characteristics. More specifically, the multifunctional characteristics include required load and deflection ratios, or static rates, of varying levels in different directions for semi-trailer axle/suspension system applications. The bushing static rate is stiff in the horizontal radial direction, so that axle/suspension system 10 remains substantially perpendicular to the direction of movement of the semi-trailer despite horizontal loading which may be placed on the axle/suspension system, and relatively soft in the vertical radial direction, to enable the suspension system and bushing 23 to absorb vertical loading shocks and provide a smooth ride for the vehicle occupants and any cargo carried by the vehicle.

The front end of a trailing arm or beam 24 in turn is rigidly attached to a mounting tube of bushing 23 by any suitable means such as welding. Beam 24 generally is rectangular-shaped and includes spaced-apart top and bottom walls 25 and 26, respectively, and spaced-apart inboard and outboard sidewalls 27 and 28, respectively. Top wall 25 is formed integrally with sidewalls 27, 28 to form an inverted generally U-shaped structure. Bottom wall 26 extends between, is welded to, and interconnects sidewalls 27, 28. An air spring 29 is suitably mounted on and extends between the upper surface of the rear end of top wall 25 and underside 13 of the vehicle. A shock absorber 30 extends between and is mounted on inboard sidewall 27 of suspension beam 24 and hanger 12.

Figure 9:
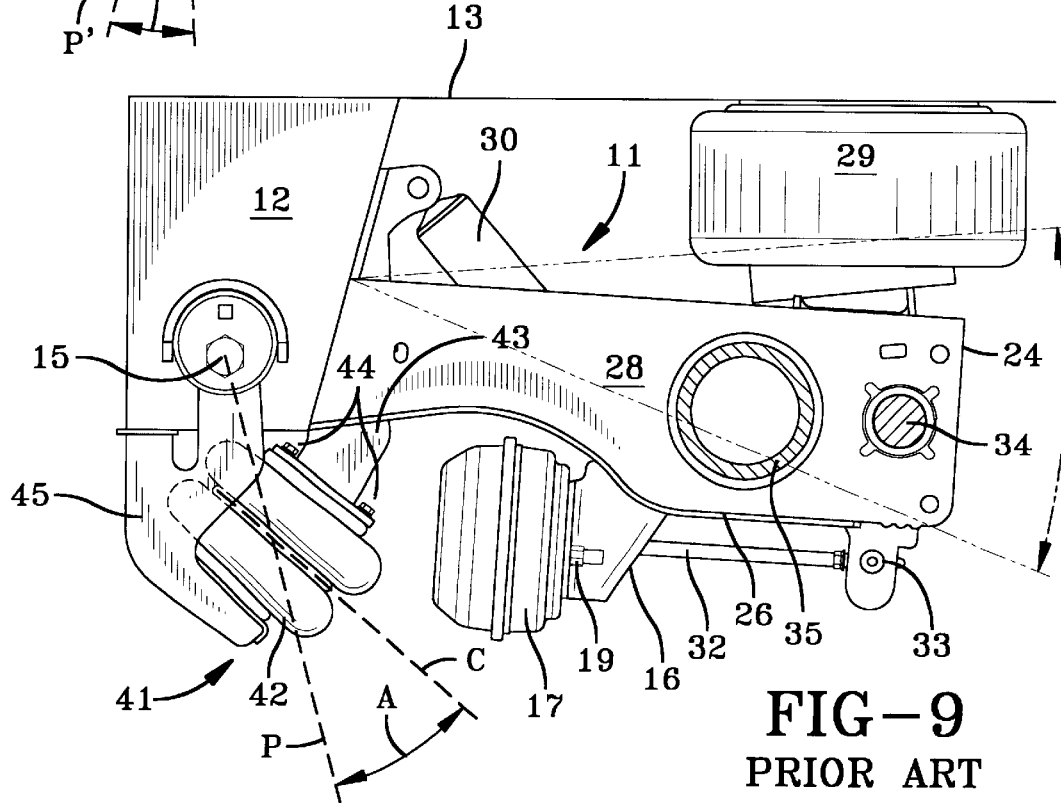
FIG. 9 is a view similar to FIG. 1, but showing in phantom lines the range of travel of the suspension assembly beam effected by the prior art European-style lift assembly, and further illustrating the angular relationship between a center line of the axle lift assembly air chamber and a radial line originating at the pivot point of the beam and passing through the center of that air chamber.

A dual brake chamber 31 of the vehicle braking system (FIGS. 3–8) is mounted on a bracket 16, which in turn is mounted on and depends from bottom wall 26 of suspension beam 24, by passage of a piston rod 32 of dual chamber 31 through an opening 14 formed in the bracket. Fasteners 19 formed integrally with a service brake chamber 17, such as threaded bolts, are passed through openings (not shown) formed in bracket 16 to secure the brake chamber to the bracket. Dual brake chamber 31 includes service brake chamber 17 and a parking brake chamber 18. It should be noted that the brake chamber shown in prior art FIGS. 1 and 9 represents only a single service brake chamber 17. Brake chamber piston 32 in turn is pivotally attached to a slack adjuster 33, which in turn is immovably mounted on a cam shaft 34 of the braking system to provide for transfer of in-line loads from the brake chamber piston into a torsional load on the cam shaft.

An axle 35 extends between and is immovably captured in suspension beam 24 and its corresponding opposite suspension beam of axle suspension system 10. A set of wheels/tires 36 is mounted on each end of axle 35 (only one set shown).

As best shown in FIGS. 3–6, axle lift assembly 40 of the present invention is mounted on beam 24 and hanger 12. However, in order to better understand the advantages of axle lift assembly 40 of the present invention, a prior art axle lift assembly 41, shown in prior art FIGS. 1, 2 and 9, now will be described. Prior art axle lift assembly 41 includes an elastomeric bellows-type air chamber 42. An upper rear end of air chamber 42 is attached to a bracket 43 by fasteners 44. Bracket 43 in turn is immovably attached by any suitable means to bottom wall 26 of suspension of beam 24. A lower front end of air chamber 42 is attached by any suitable means to a bracket 45, which in turn is immovably attached by any suitable means to hanger 12. The entire axle lift assembly 41 is removable from hanger 12 and beam 24.

Figure 4:
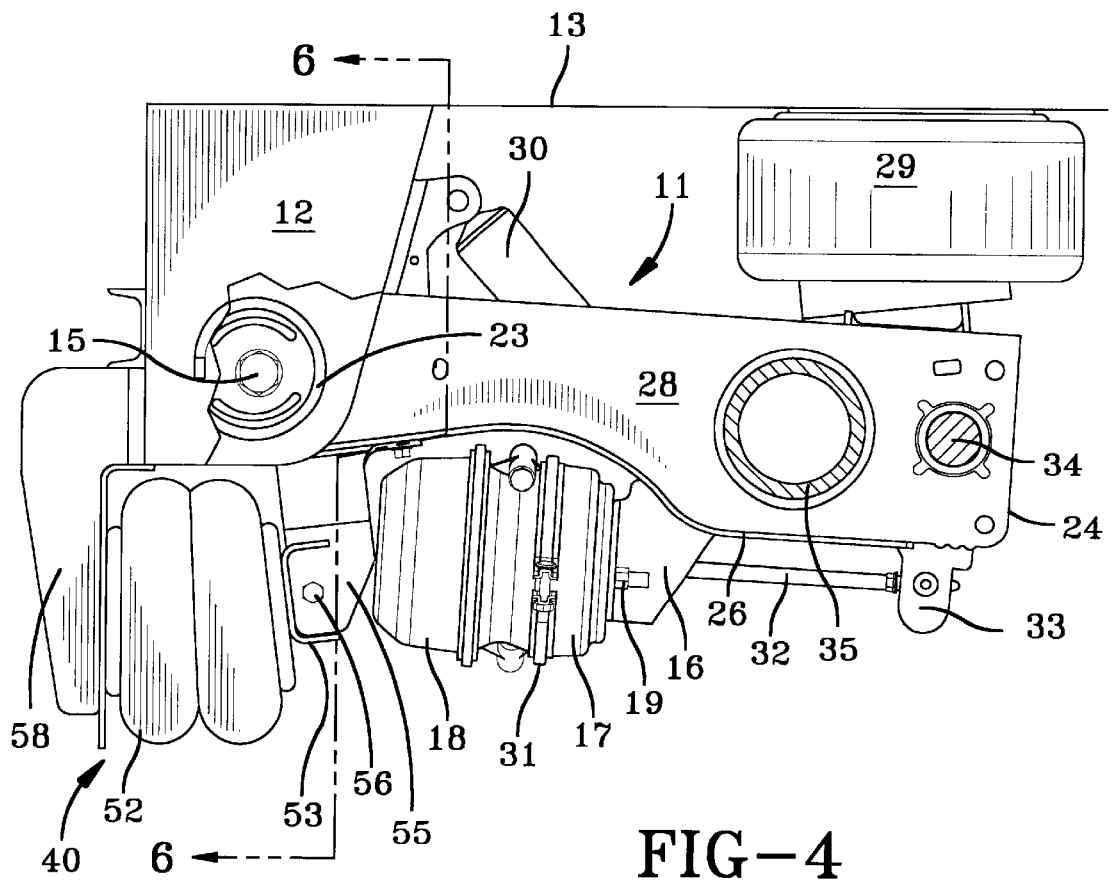
FIG. 4 is a side elevational view similar to FIGS. 1 and 2, with portions broken away, but showing the axle lift assembly of the present invention mounted on and beneath the hanger and beam of the suspension assembly and providing adequate clearance for a dual service/parking brake chamber beneath the beam.
Figure 5:
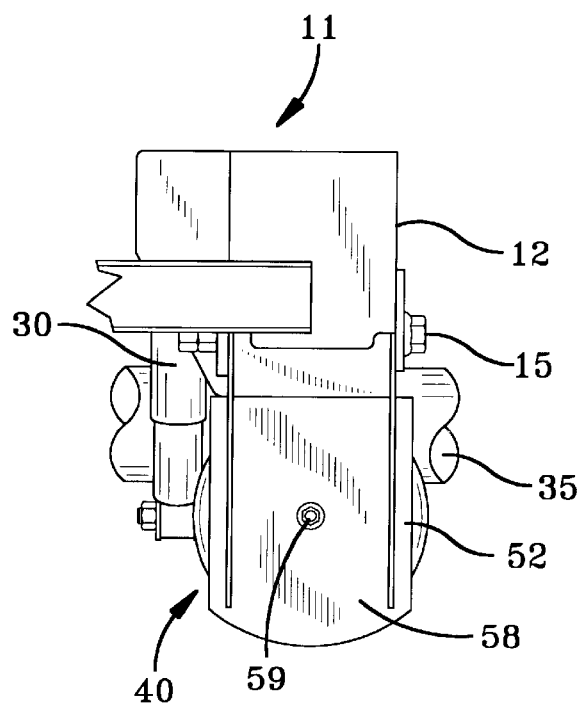
FIG. 5 is a fragmentary left-hand front view of the suspension assembly and underbeam axle lift assembly of the present invention shown in FIG. 4.
Figure 6:
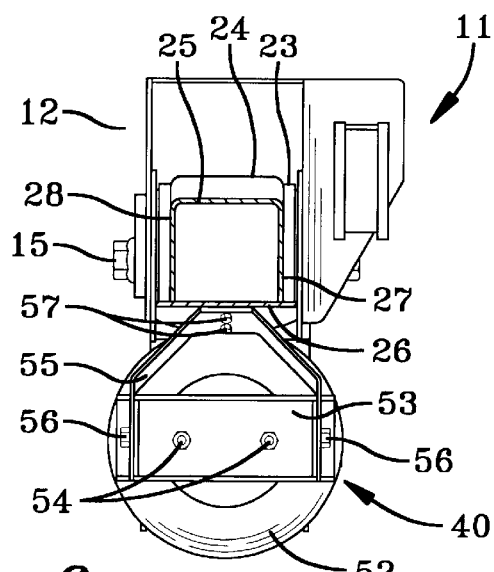
FIG. 6 is a view, with portions in section, taken along lines 6—6 of FIG. 4.

In comparison and contrast, axle lift assembly 40 of the present invention also includes an elastomeric bellows-type air chamber 52. As best illustrated in FIGS. 3, 4 and 6, a rear end of air chamber 52 is immovably attached to a short, transversely extending U-shaped channel 53 by a pair of transversely-spaced fasteners 54. U-shaped channel 53 in turn is immovably and removably mounted on a bracket 55 by fasteners 56. Bracket 55 in turn is immovably attached to beam bottom wall 26 by fasteners 57. As best depicted in FIGS. 3–5, a front end of air chamber 52 is immovably attached to a support member 58. More specifically, support member 58 is a vertically extending member which is immovably attached to a front surface of hanger 12, such as by welds. A fastener 59, such as a threaded bolt, is formed integrally with a front end of air chamber 52 and passes through an opening (not shown) formed in support member 58, and a nut is threadably attached to the bolt for completing the immovable and removable mounting of the air chamber on hanger 12 and beam 24.

In order to clearly illustrate one of the key features of the present invention, the operation of prior art underbeam axle lift assembly 41 will be described in greater detail. More specifically, and with particular reference to FIG. 1, it can be seen that prior art axle lift assembly 41 can be easily mounted beneath suspension beam 11 and hanger 12, yet still leave enough clearance for installation and operation of single service brake chamber 17. However, it can also be seen that in order to create such clearance, air chamber 42 of axle lift assembly is mounted at approximately a 45 degree angle relative to vertical and horizontal planes. At least two problems can be identified with respect to the prior art arrangement of parts, which the present invention overcomes. First, and with specific reference to FIG. 2, it can be seen that prior art axle lift assembly 41 is impossible to use in most applications in the United States. This is due to the requirement that each axle have not only a service brake chamber 17, but also a parking brake chamber 18. The hatched area of FIG. 2 illustrates this clearance issue. This problem fails to exist in Europe since single service brake chambers 17 can be used on certain axles, while in the United States most applications require that dual brake chambers 31 be used on each axle. With particular reference to FIGS. 3 and 4, it is clearly shown that axle lift assembly 40 of the present invention provides enough clearance, when mounted beneath beam 11 and hanger 12, to accommodate a dual brake chamber 31 also mounted beneath the beam.

A second problem is best shown in FIG. 9, where it can clearly be seen that the angle A, measured between a pivot point radial P passing through the center of air chamber 42 and a center line C of the air chamber, is relatively wide. That is, the angle is about twice as wide as the same angle A' measured between pivot point radial P' and air chamber center line C'. This is merely one way to illustrate that axle lift assembly 40 of the present invention operates more efficiently than prior art axle lift assembly 41. Stated another way, present invention lift assembly 40 has better leverage to apply lift force to axle 35 than does prior art lift assembly 41. This is the case throughout the slightly generally arcuate travel of air chambers 42 and 52. Since air chamber 52 of the present invention operates more efficiently, as shown by narrower angle A', then it follows that air chamber 52 is subjected to less fatigue stress and wears better than prior art air chamber 42.

Figure 7:
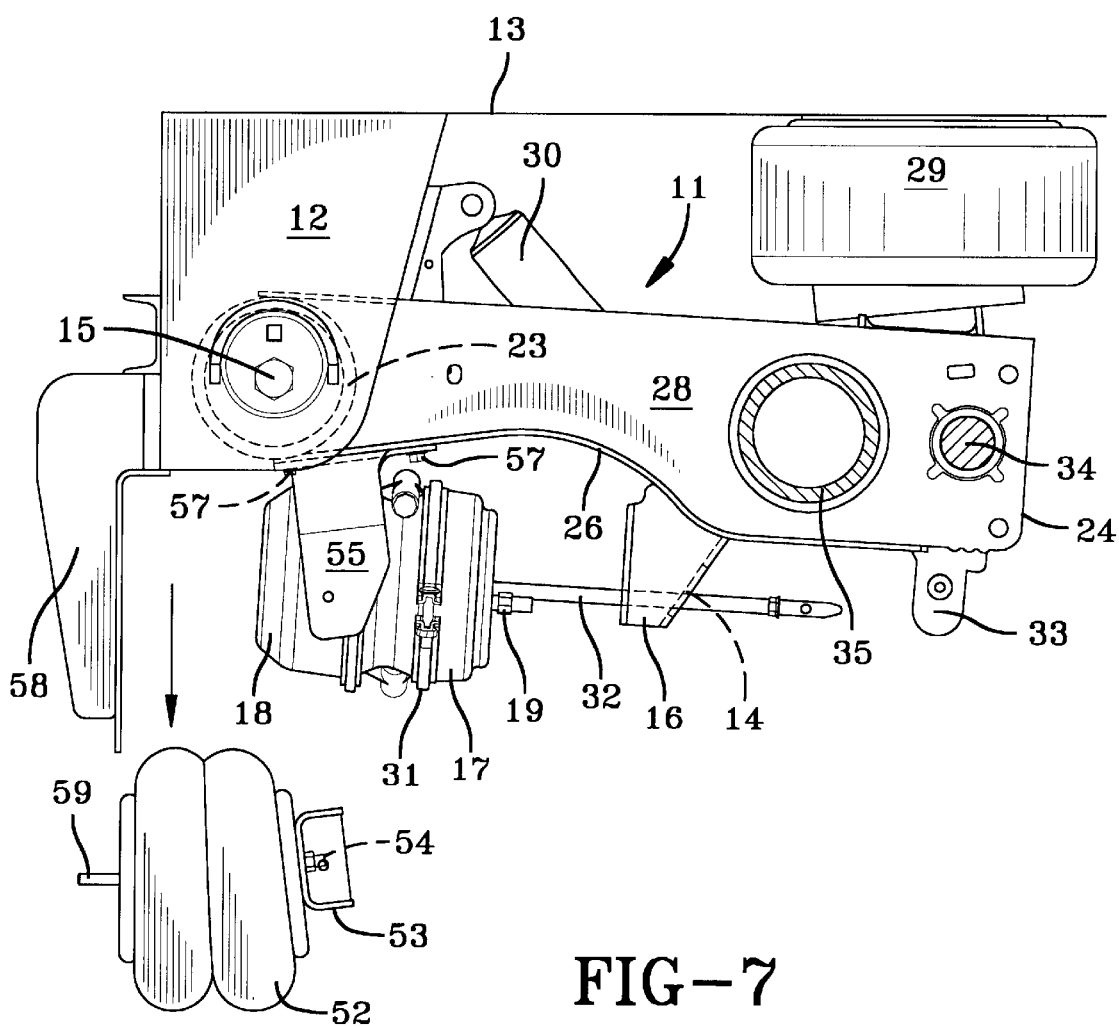
FIG. 7 is a view similar to FIG. 4, with hidden portions shown in phantom lines, and showing the manner in which certain components of the axle lift assembly of the present invention are readily removed, enabling removal and/or installation of the dual service/parking brake chamber.
Figure 8:
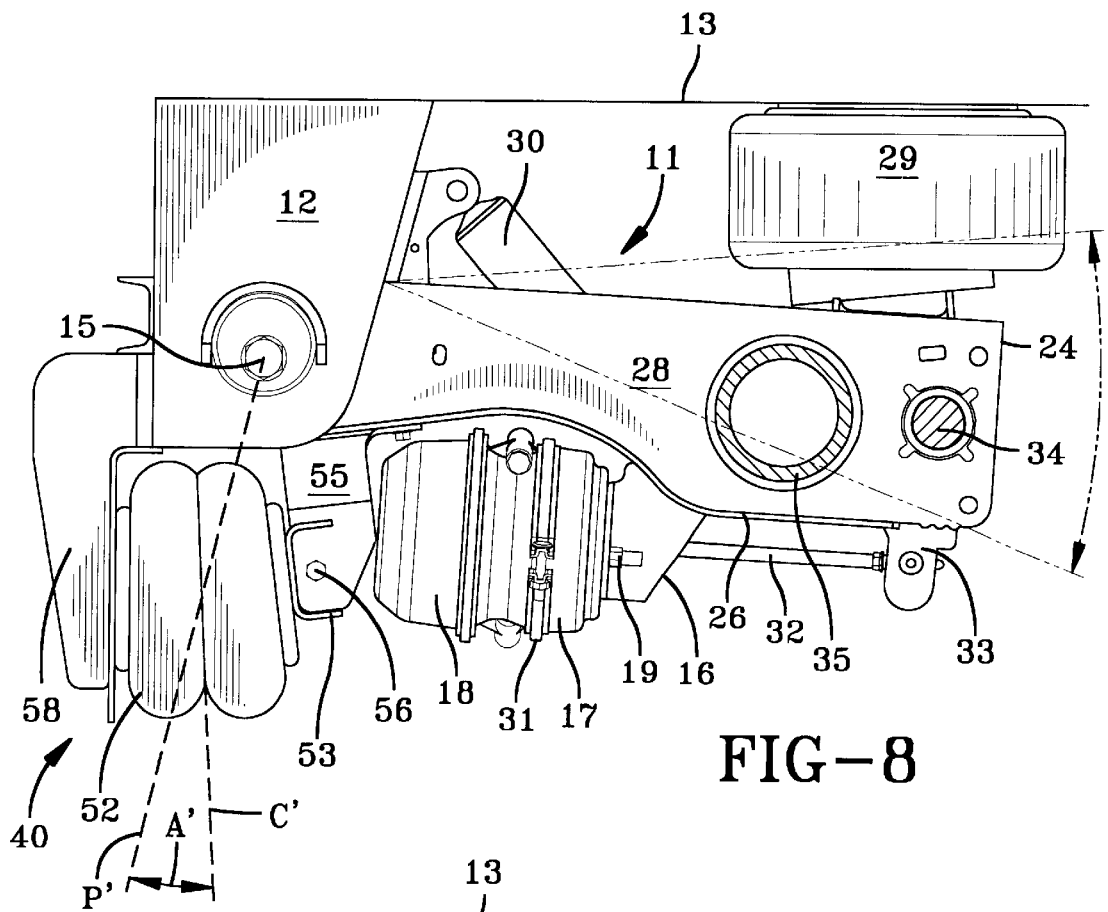
FIG. 8 is a view similar to FIG. 4, but showing in phantom lines the range of travel of the suspension assembly beam effected by the axle lift assembly of the present invention, and further illustrating the angular relationship between a center line of the axle lift assembly air chamber and a radial line originating at the pivot point of the beam and passing through the center of that air chamber.

Moreover, due to its convenient removable mounting on hanger 12 and beam 11, and as best shown in FIGS. 5–7, air chamber 52 of present invention axle lift assembly 40 can be quickly and easily removed simply by loosening three fasteners (56 and 59) and dropping the chamber from its mounting. This provides clearance for removal and installation of dual brake chamber 31, such as for replacement.

It is understood that axle lift assembly 40 of the present invention can be utilized on trailers of semi-trailers, as well as other vehicles such as straight trucks having axles which can be advantageously lifted from contact with the driving surface. Also, other types of suspension assemblies, such as those having tapered beams, can benefit from incorporation of axle lift assembly 40 of the present invention. Also, force generating means other than air chamber 52, such as a coil spring or piston, could be utilized without affecting the overall concept of the invention.

Accordingly, the improved underbeam axle lift assembly is simplified, provides an effective, safe, inexpensive, and efficient system which achieves all the enumerated objectives, provides for eliminating difficulties encountered with prior underbeam axle lift assemblies and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved underbeam axle lift assembly is constructed, arranged and used, the characteristics of the construction and arrangement, and the advantageous, new and useful results obtained; the new and useful structures, devices, elements, arrangements, parts and combinations are set forth in the appended claims.

What is claimed is:

1. An assembly for lifting a beam and an axle of an axle/suspension assembly, said lift assembly including:
   (a) means mounted adjacent to and substantially below a lower surface of said beam, said means being disposed to act substantially horizontally on a bracket depending from the beam for generating a force for lifting said beam and said axle, whereby a dual service/parking brake chamber is mounted substantially below said beam lower surface and adjacent to said force generating means.

2. The lift assembly of claim 1, in which said force generating means is an elastomeric air chamber; and in which upon supplying air to the air chamber said chamber expands in a generally horizontal direction, and upon evacuating air from the chamber said chamber contracts from said expanded state in a generally horizontal direction.

3. The lift assembly of claim 2, in which said air chamber is removably mounted on front and rear brackets; in which said front bracket is mounted on a hanger of said axle/suspension assembly; and in which said rear bracket is mounted on a lower surface of said beam.

4. The lift assembly of claim 5, in which said front bracket is generally vertically extending and is mounted generally on a front surface of said hanger.

5. The lift assembly of claim 4, in which said rear bracket overlaps and provides clearance for a front portion of said dual brake chamber.

6. The lift assembly of claim 3, in which a generally horizontal force is produced by said force generating means; and in which said force translates into a pivotal predominantly vertical arcuate motion of said beam and said axle about said hanger.

7. The lift assembly of claim 5, in which removal of said air chamber provides clearance for replacement of said dual brake chamber.

8. An assembly for lifting a beam and an axle of an axle/suspension assembly, said lift assembly including:
 (a) means mounted generally adjacent to said beam and generally below a lowermost surface of said beam, for generating a force for lifting said axle and the beam, the lift assembly enabling disposition of a dual service/parking brake chamber generally adjacent to said beam and generally below a lowermost surface of the beam, said force generating means being an elastomeric air chamber which is generally horizontally oriented, said air chamber being removably mounted on front and rear brackets, said front bracket being generally vertically extending and being mounted generally on a front surface of a hanger of said axle/suspension assembly, said rear bracket being mounted on a lower surface of said beam, so that upon supplying air to the air chamber said chamber expands in a generally horizontal direction, and upon evacuating air from the chamber said chamber contracts from said expanded state in a generally horizontal direction.

9. An assembly for lifting a beam and an axle of an axle/suspension assembly, said lift assembly including:
 (a) means mounted generally adjacent to said beam and generally below a lowermost surface of said beam, for generating a force for lifting said axle and the beam, the lift assembly enabling disposition of a dual service/parking brake chamber generally adjacent to said beam and generally below a lowermost surface of the beam, said force generating means being an elastomeric air chamber which is generally horizontally oriented, said air chamber being removably mounted on front and rear brackets, said front bracket being generally vertically extending and being mounted generally on a front surface of a hanger of said axle/suspension assembly, said rear bracket being mounted on a lower surface of said beam and overlapping and providing clearance for a front portion of said dual brake chamber, so that upon supplying air to the air chamber said chamber expands in a generally horizontal direction, and upon evacuating air from the chamber said chamber contracts from said expanded state in a generally horizontal direction.

10. An assembly for lifting a beam and an axle of an axle/suspension assembly, said lift assembly including:
 (a) means mounted generally adjacent to said beam and generally below a lowermost surface of said beam, for generating a force for lifting said axle and the beam, the lift assembly enabling disposition of a dual service/parking brake chamber generally adjacent to said beam and generally below a lowermost surface of the beam, said force generating means being an elastomeric air chamber which is generally horizontally oriented, said air chamber being removably mounted on front and rear brackets, said front bracket being generally vertically extending and being mounted generally on a front surface of a hanger of said axle/suspension assembly, said rear bracket being mounted on a lower surface of said beam and overlapping and providing clearance for a front portion of said dual brake chamber, and removal of said air chamber provides clearance for replacement of said dual brake chamber, so that upon supplying air to the air chamber said chamber expands in a generally horizontal direction, and upon evacuating air from the chamber said chamber contracts from said expanded state in a generally horizontal direction.

11. An assembly for lifting a beam and an axle of an axle/suspension assembly, said lift assembly including:
 (a) means mounted generally adjacent to said beam and generally below a lowermost surface of said beam, for generating a force for lifting said axle and the beam, the lift assembly enabling disposition of a dual service/parking brake chamber adjacent to said force generating means, said force generating means being an elastomeric air chamber which is generally horizontally oriented, said air chamber being removably mounted on front and rear brackets, said front bracket being generally vertically extending and being mounted generally on a front surface of a hanger of said axle/suspension assembly, said rear bracket being mounted on a lower surface of said beam, so that upon supplying air to the air chamber said chamber expands in a generally horizontal direction, and upon evacuating air from the chamber said chamber contracts from said expanded state in a generally horizontal direction.

12. An assembly for lifting a beam and an axle of an axle/suspension assembly, said lift assembly including:
 (a) means mounted generally adjacent to said beam and generally below a lowermost surface of said beam, for generating a force for lifting said axle and the beam, the lift assembly enabling disposition of a dual service/parking brake chamber adjacent to said force-generating means, said force generating means being an elastomeric air chamber which is generally horizontally oriented, said air chamber being removably mounted on front and rear brackets, said front bracket being generally vertically extending and being mounted generally on a front surface of a hanger of said axle/suspension assembly, said rear bracket being mounted on a lower surface of said beam and overlapping and providing clearance for a front portion of said dual brake chamber, so that upon supplying air to the air chamber said chamber expands in a generally horizontal direction, and upon evacuating air from the chamber said chamber contracts from said expanded state in a generally horizontal direction.

13. An assembly for lifting a beam and an axle of an axle/suspension assembly, said lift assembly including:
 (a) means mounted generally adjacent to said beam and generally below a lowermost surface of said beam, for generating a force for lifting said axle and the beam, the lift assembly enabling disposition of a dual service/parking brake chamber adjacent to said force-generating means, said force generating means being an elastomeric air chamber which is generally horizontally oriented, said air chamber being removably mounted on front and rear brackets, said front bracket being generally vertically extending and being mounted generally on a front surface of a hanger of said axle/suspension assembly, said rear bracket being mounted on a lower surface of said beam and overlapping and providing clearance for a front portion of said dual brake chamber, and removal of said air chamber provides clearance for replacement of said dual brake chamber, so that upon supplying air to the air chamber said chamber expands in a generally horizontal direction, and upon evacuating air from the chamber said chamber contracts from said expanded state in a generally horizontal direction.

14. An assembly for lifting a beam and an axle of an axle/suspension assembly, said lift assembly including:
 (a) means mounted adjacent to and substantially below a lower surface of said beam, said means being an elastomeric air chamber disposed to act substantially horizontally on a bracket depending from the beam, so that upon supplying air to the air chamber said chamber expands in a generally horizontal direction for generating a force for lifting said beam and said axle, and upon evacuating air from the chamber said chamber contracts from said expanded state in a generally horizontal direction, whereby a dual service/parking brake chamber is mounted substantially below said beam lower surface and adjacent to said force generating means.

15. An assembly for lifting a beam and an axle of an axle/suspension assembly, said lift assembly including:

(a) means mounted adjacent to and substantially below a lower surface of said beam, said means being an elastomeric air chamber disposed to act substantially horizontally on a rear bracket depending from the beam, said air chamber being removably mounted on a front bracket and said rear bracket, said front bracket being mounted on a hanger of said axle/suspension assembly and said rear bracket being mounted on a lower surface of said beam, so that upon supplying air to the air chamber said chamber expands in a generally horizontal direction for generating a force for lifting said beam and said axle, and upon evacuating air from the chamber said chamber contracts from said expanded state in a generally horizontal direction, whereby a dual service/parking brake chamber is mounted substantially below said beam lower surface and adjacent to said force generating means.

16. An assembly for lifting a beam and an axle of an axle/suspension assembly, said lift assembly including:

(a) means mounted adjacent to and substantially below a lower surface of said beam, said means being an elastomeric air chamber disposed to act substantially horizontally on a rear bracket depending from the beam, said air chamber being removably mounted on a front bracket and said rear bracket, said front bracket being mounted on a front surface of a hanger of said axle/suspension assembly and being generally vertically extending, and said rear bracket being mounted on a lower surface of said beam, so that upon supplying air to the air chamber said chamber expands in a generally horizontal direction for generating a force for lifting said beam and said axle, and upon evacuating air from the chamber said chamber contracts from said expanded state in a generally horizontal direction, whereby a dual service/parking brake chamber is mounted substantially below said beam lower surface and adjacent to said force generating means.

17. An assembly for lifting a beam and an axle of an axle/suspension assembly, said lift assembly including:

(a) means mounted adjacent to and substantially below a lower surface of said beam, said means being an elastomeric air chamber disposed to act substantially horizontally on a rear bracket depending from the beam, said air chamber being removably mounted on a front bracket and said rear bracket, said front bracket being mounted on a front surface of a hanger of said axle/suspension assembly and being generally vertically extending, and said rear bracket being mounted on a lower surface of said beam and overlapping and providing clearance for a front portion of a dual service/parking brake chamber mounted substantially below said beam lower surface and adjacent to said force generating means, so that upon supplying air to the air chamber said chamber expands in a generally horizontal direction for generating a force for lifting said beam and said axle, and upon evacuating air from the chamber said chamber contracts from said expanded state in a generally horizontal direction.

18. An assembly for lifting a beam and an axle of an axle/suspension assembly, said lift assembly including:

(a) means mounted adjacent to and substantially below a lower surface of said beam, said means being an elastomeric air chamber disposed to act substantially horizontally on a rear bracket depending from the beam, said air chamber being removably mounted on a front bracket and said rear bracket, said front bracket being mounted on a hanger of said axle/suspension assembly and said rear bracket being mounted on a lower surface of said beam, so that upon supplying air to the air chamber said chamber expands in a generally horizontal direction for generating a generally horizontal force which translates into a pivotal predominantly vertical arcuate motion of said beam and said axle about said hanger, for lifting said beam and said axle, and upon evacuating air from the chamber said chamber contracts from said expanded state in a generally horizontal direction, whereby a dual service/parking brake chamber is mounted substantially below said beam lower surface and adjacent to said force generating means.

19. An assembly for lifting a beam and an axle of an axle/suspension assembly, said lift assembly including:

(a) means mounted adjacent to and substantially below a lower surface of said beam, said means being an elastomeric air chamber disposed to act substantially horizontally on a rear bracket depending from the beam, said air chamber being removably mounted on a front bracket and said rear bracket, said front bracket being mounted on a front surface of a hanger of said axle/suspension assembly and being generally vertically extending, and said rear bracket being mounted on a lower surface of said beam and overlapping and providing clearance for a front portion of a dual service/parking brake chamber mounted substantially below said beam lower surface and adjacent to said force generating means, so that upon supplying air to the air chamber said chamber expands in a generally horizontal direction for generating a force for lifting said beam and said axle, and upon evacuating air from the chamber said chamber contracts from said expanded state in a generally horizontal direction, and whereby removal of said air chamber provides clearance for replacement of said dual brake chamber.

* * * * *